UNITED STATES PATENT OFFICE.

JAMES A. POND, OF AUCKLAND, NEW ZEALAND.

PROCESS OF COATING WOOD, PAPER, &c., WITH IMPERVIOUS ENAMEL.

SPECIFICATION forming part of Letters Patent No. 372,927, dated November 8, 1887.

Application filed May 15, 1886. Serial No. 202,282. (No specimens.) Patented in New Zealand February 10, 1886, No. 1,717; in Victoria March 4, 1886, No. 4,456; in England March 13, 1886, No. 3,572; in New South Wales April 20, 1886, and in Tasmania February 14, 1887, No. 449/9.

*To all whom it may concern:*

Be it known that I, JAMES ALEXANDER POND, a subject of the Queen of Great Britain, residing at Auckland, in the provincial district of Auckland and British Colony of New Zealand, analyst, have invented an Improved Process of Coating Wood, Paper, Cloth, Papier-Maché, and other Fibrous Materials with a Comparatively Impervious Enamel, (for which an application for patent was filed in the British Colony of New Zealand on the 10th day of February, 1886, and numbered 1,717; that under the laws governing the grant of patents in said colony the Letters Patent will bear date as of the day of filing, and that up to the present time the patent on said application filed in said colony has not been granted,) of which the following is a specification.

This invention has been designed mainly for the purpose of providing a cheap form of package in which edible substances, both liquid and solid, may be transported from place to place without being affected or flavored by the material of which such package is constructed; but, although this is the main object, it is by no means the only object of the invention by which enameled surfaces are produced which are unaffected by and impervious to water, grease, dilute acids, and brine.

In carrying out my invention, I first produce the enamel itself. This is composed mainly, and, if preferred, wholly, of shellac; but for certain purposes, hereinafter explained, there may be added to the shellac from two to six per cent. of beeswax, stearic, oleic, or any other of the fatty acids. This enamel may be used in either a liquid or a solid state. If it is required in a liquid condition, I heat the shellac in a steam-jacketed pan or oil-bath to a temperature not exceeding 280° Fahrenheit, at the same time incorporating the beeswax or fatty acids, if desired, by stirring vigorously. If it is required in a solid condition, I either cast it after melting, as described, into any form desirable or apply it directly in its ordinary form of shellac, as known in commerce.

Whether the enamel be in either a liquid or a solid condition it must be applied to the surface to be coated with great pressure and at a high temperature—say 230° to 280° Fahrenheit. There are various modes of applying such pressure; but the mechanical devices needful for this purpose form no part of my invention. I find it practicable to place the enamel in either a liquid or a solid state in an open tray, from which it is picked up by a heated surface either flat or in rolls. The layer of enamel thus taken up is then transferred to the surface to be coated by pressure. In the case of rolls I take up the layer on a heated lower roll and transfer it to the surface—say of wood—to be coated by passing between said heated lower roll and a heavily-weighted upper roll, by which means the lower roll enamels the surface presented to it, filling up its every crevice. A still higher polish may be obtained by passing the enameled article between heated rollers under pressure or by applying rapidly-revolving heated metal disks to the enameled surface.

The beeswax and the other allied substances herein mentioned are useful for the purpose of producing a higher gloss to the enamel. If desired, this enamel may be colored by means that are well known.

This process of enameling surfaces is also useful as a preservative agent and for improving the appearance of the material coated.

To still further insure the firm adhesion of the enamel to the wood or other substance, I apply a solution of shellac in methylated alcohol to the surface to be enameled, allowing the spirit to evaporate before enameling.

Having thus described my invention, I would have it understood that I am aware that articles and materials of different character have been coated with a solution of shellac and alcohol, such solution being applied in a cold state; but I am not aware that an enamel has been formed upon fabric or other material or articles by applying the same under pressure and at a high temperature. I do not therefore claim, broadly, the use of shellac in the production of enamels; but

What I do claim, and desire to secure by Letters Patent, is—

The process herein described of coating wood, paper, cloth, and other fibrous material, which consists of first applying to the surface to be enameled a solution of shellac in methylated alcohol, evaporating the alcohol, and subsequently applying a coating of enamel composed wholly or mainly of shellac, applied under great pressure and at a high temperature, substantially as herein described and explained.

J. A. POND.

Witnesses:
THOMAS COTTER,
   Solicitor, Auckland, New Zealand.
CHARLES HERKELL,
   Merchant, Auckland.